US012318892B2

(12) United States Patent
Folke

(10) Patent No.: US 12,318,892 B2
(45) Date of Patent: Jun. 3, 2025

(54) ARRANGEMENT FOR POWER TOOL, FRONT PART ATTACHMENT AND POWER TOOL

(71) Applicant: ATLAS COPCO INDUSTRIAL TECHNIQUE AB, Stockholm (SE)

(72) Inventor: Martin Folke, Värmdö (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 0 days.

(21) Appl. No.: 18/684,294

(22) PCT Filed: Aug. 16, 2022

(86) PCT No.: PCT/EP2022/072829
§ 371 (c)(1),
(2) Date: Feb. 16, 2024

(87) PCT Pub. No.: WO2023/025620
PCT Pub. Date: Mar. 2, 2023

(65) Prior Publication Data

US 2024/0261945 A1 Aug. 8, 2024

(30) Foreign Application Priority Data

Aug. 23, 2021 (SE) .................................... 2130223-7

(51) Int. Cl.
*B25B 21/00* (2006.01)
*B25B 23/00* (2006.01)

(52) U.S. Cl.
CPC ........ *B25B 23/0028* (2013.01); *B25B 21/002* (2013.01)

(58) Field of Classification Search
CPC .......................... B25B 23/0028; B25B 21/002
(Continued)

(56) References Cited

U.S. PATENT DOCUMENTS 3,602,071 A * 8/1971 Juhasz .................. B25B 21/002 81/57.3
4,171,651 A 10/1979 Dacunto
(Continued)

FOREIGN PATENT DOCUMENTS

DE 102013213806 A1 5/2014
DE 102019113212 A1 11/2020
(Continued)

OTHER PUBLICATIONS

Atlas Copco Industrial Technique Ab, International Patent Application No. PCT/EP2022/072829, International Search Report, Nov. 29, 2022.
(Continued)

*Primary Examiner* — Robert F Long
(74) *Attorney, Agent, or Firm* — Moore & Van Allen PLLC; W. Kevin Ransom

(57) ABSTRACT

An arrangement for a power tool comprising a drive part for rotational locking to a drive shaft with respect to a rotation axis; a base part for fixation to a base structure; and an output element having an indexing part and a driven part rotatable relative to the indexing part about the rotation axis; wherein the output element is movable along the rotation axis relative to the drive part and the base part from a locked position where the indexing part engages the base part and the driven part engages the drive part, to an intermediate position where indexing part engages the base part and the driven part is disengaged from the drive part, and further to an unlocked position where the indexing part is disengaged from the base part and the driven part is disengaged from the drive part.

17 Claims, 10 Drawing Sheets

(58) Field of Classification Search
USPC ........ 173/197, 81, 90, 140–141, 162.1, 198, 173/213, 168–171
See application file for complete search history.

(56) References Cited

U.S. PATENT DOCUMENTS

| | | | | |
|---|---|---|---|---|
| 4,287,795 | A | 9/1981 | Curtiss | |
| 4,538,483 | A * | 9/1985 | Batten | B25B 21/002 81/57.3 |
| 4,617,844 | A * | 10/1986 | Batten | B25B 23/0035 81/436 |
| 4,827,810 | A * | 5/1989 | Rushanan | B25B 21/002 81/57.13 |
| 5,305,666 | A * | 4/1994 | LaTorre | B25B 23/1415 81/55 |
| 5,522,286 | A * | 6/1996 | Wilson, Jr. | B25B 13/48 81/57.13 |
| 5,697,266 | A * | 12/1997 | Wilson, Jr. | B25B 13/461 81/57.3 |
| 6,796,385 | B1 * | 9/2004 | Cobzaru | B25B 23/141 173/29 |
| 7,874,232 | B2 * | 1/2011 | Gauthreaux | B25B 23/0035 81/58 |
| 8,671,804 | B2 * | 3/2014 | Galat | B25B 21/002 81/57.14 |
| 9,849,576 | B2 | 12/2017 | Tussing | |
| 11,034,002 | B2 | 6/2021 | Gordon et al. | |
| 11,090,783 | B2 * | 8/2021 | Angello | F16H 57/02 |
| 11,759,936 | B2 * | 9/2023 | Magda | F16H 1/20 81/57.29 |
| 12,128,530 | B2 * | 10/2024 | Bergmann | B25B 17/00 |
| 2004/0177978 | A1 * | 9/2004 | Cobzaru | B25B 23/0021 173/1 |
| 2007/0114049 | A1 * | 5/2007 | Steverding | F16P 3/20 173/15 |
| 2009/0084567 | A1 * | 4/2009 | Basham | B25C 7/00 173/29 |
| 2010/0269646 | A1 | 10/2010 | Le Du et al. | |
| 2013/0180364 | A1 * | 7/2013 | Galat | B25B 23/0085 81/56 |
| 2015/0314427 | A1 * | 11/2015 | Carlsson | B25B 13/481 81/57.3 |
| 2015/0343583 | A1 * | 12/2015 | McRoberts | B23Q 5/045 173/213 |
| 2018/0029214 | A1 | 2/2018 | Brennenstuhl et al. | |
| 2021/0213597 | A1 * | 7/2021 | Magda | B25B 23/0035 |
| 2021/0276163 | A1 * | 9/2021 | Eriksson | B25B 17/00 |
| 2021/0283752 | A1 * | 9/2021 | Forsberg | B25B 21/002 |
| 2022/0193875 | A1 | 6/2022 | Lautenschlger et al. | |
| 2022/0379444 | A1 * | 12/2022 | Beer | B25F 5/02 |
| 2023/0321794 | A1 * | 10/2023 | Andersson | B25B 23/0021 81/52 |

FOREIGN PATENT DOCUMENTS

| | | | | |
|---|---|---|---|---|
| FR | 2736295 | A1 | 1/1997 | |
| TW | 202033892 | A * | 9/2020 | B25B 13/06 |
| WO | 2021013505 | A1 | 1/2021 | |

OTHER PUBLICATIONS

Atlas Copco Industrial Technique Ab, International Patent Application No. PCT/EP2022/072829, Written Opinion, Nov. 29, 2022.
Atlas Copco Industrial Technique Ab, International Patent Application No. PCT/EP2022/072829, International Preliminary Report on Patentability, Feb. 27, 2024.
Atlas Copco Industrial Technique Ab, Swedish Patent Application No. 2130223-7, Swedish Search Report, Mar. 14, 2022.

* cited by examiner

ARRANGEMENT FOR POWER TOOL, FRONT PART ATTACHMENT AND POWER TOOL

CROSS-REFERENCE TO RELATED APPLICATIONS

This application is a National Stage Patent Application (filed under 35 § U.S.C. 371) of PCT/EP2022/072829, filed Aug. 16, 2022 of the same title, which, in turn claims priority to Swedish Patent Application No. 2130223-7 filed Aug. 23, 2021 of the same title; the contents of each of which are hereby incorporated by reference.

TECHNICAL FIELD

The present disclosure generally relates to power tools. In particular, an arrangement for a power tool, a front part attachment comprising an arrangement, and a power tool comprising an arrangement or a front part attachment, are provided.

BACKGROUND

Some industrial power tools comprise a front part attachment having an elongated body and an output member. The output member may for example engage a nut for rotation of the nut. In some situations, it is desired to change an angle of the elongated body relative to a main body of the power tool. This is referred to as indexing. One reason for this may be to provide an improved access of the output member to narrow spaces.

Power tools comprising such indexable elongated body are known. However, with some prior art power tools, there is a risk that the elongated body rotates during indexing if a drive of the power tool is actuated by mistake. This may cause severe injuries to the user. For example, if the output member is engaged with a nut and the elongated body starts to rotate, the main body moves forcefully and user's hand might be squeezed. If the output member is in the air and the elongated body rotates due to actuation of the drive, the elongated body will spin like a propeller in the air with a high risk of injuries.

SUMMARY

One object of the present disclosure is to provide an arrangement for a power tool having a base structure and a drive shaft rotatable relative to the base structure, which arrangement enables a secure operation.

A further object of the present disclosure is to provide an arrangement for a power tool having a base structure and a drive shaft rotatable relative to the base structure, which arrangement enables a secure indexing of an elongated body of a front part attachment.

A still further object of the present disclosure is to provide an arrangement for a power tool having a base structure and a drive shaft rotatable relative to the base structure, which arrangement has a compact design.

A still further object of the present disclosure is to provide an arrangement for a power tool having a base structure and a drive shaft rotatable relative to the base structure, which arrangement provides an improved user experience.

A still further object of the present disclosure is to provide an arrangement for a power tool having a base structure and a drive shaft rotatable relative to the base structure, which arrangement enables efficient detachment of a front part attachment.

A still further object of the present disclosure is to provide an arrangement for a power tool having a base structure and a drive shaft rotatable relative to the base structure, which arrangement solves several or all of the foregoing objects in combination.

A still further object of the present disclosure is to provide a front part attachment solving one, several or all of the foregoing objects.

A still further object of the present disclosure is to provide a power tool solving one, several or all of the foregoing objects.

According to a first aspect, there is provided an arrangement for a power tool having a base structure and a drive shaft rotatable relative to the base structure about a rotation axis, the arrangement comprising a drive part for rotational locking to the drive shaft with respect to the rotation axis; a base part for fixation to the base structure; and an output element having an indexing part and a driven part rotatable relative to the indexing part about the rotation axis; wherein the output element is movable along the rotation axis relative to the drive part and the base part from a locked position where the indexing part engages the base part and the driven part engages the drive part, to an intermediate position where indexing part engages the base part and the driven part is disengaged from the drive part, and further to an unlocked position where the indexing part is disengaged from the base part and the driven part is disengaged from the drive part.

When the indexing part is disengaged from the base part in the unlocked position, the output element can be removed or indexed (reoriented with respect to the rotation axis). The arrangement may be an adapter for a front part attachment. In this case, the arrangement may be referred to as a quick index/change adapter.

The intermediate position of the output element lies between the locked position and the unlocked position. Thus, when releasing the output element, the output element first moves from the locked position to the intermediate position, and then moves from the intermediate position to the unlocked position. Since the output element has to move to the intermediate position before reaching the unlocked position, the arrangement ensures that the driven part is disengaged from the drive part before the indexing part is disengaged from the base part. That is, the indexing part can never be disengaged from the base part before the driven part has been disengaged from the drive part. In this way, the output element (and any elongated body fixed thereto) cannot start to spin and injure a user should the drive of the power tool accidentally be activated.

The arrangement may be said to comprise an indexing interface and a drive interface. The indexing interface comprises the base part and the indexing part. The drive interface comprises the drive part and the driven part.

The indexing part and the driven part may be locked to each other along the rotation axis. That is, the driven part may only move relative to the indexing part in one degree of freedom (a rotation about the rotation axis). The output element may comprise a bearing allowing relative rotation between the driven part and the indexing part about the rotation axis.

The power tool may for example be a tightening tool, such as a screwdriver or nutrunner. The arrangement can be used in conjunction with power tool accessories, such as a front part attachment.

Each of the base part and the indexing part may be cylindrical. The indexing part may be arranged radially inside the base part with respect to the rotation axis. The base part and the indexing part may be concentric with the rotation axis.

The drive part and the driven part may be concentric with the rotation axis. The drive part and the driven part may be arranged radially inside the base part and the indexing part. The drive part may be hollow for receiving the drive shaft.

A movement direction of the output element from the locked position to the unlocked position may be referred to as an unlocking direction. Conversely, a movement direction of the output element from the unlocked position to the locked position may be referred to as a locking direction.

The arrangement may further comprise a blocking device configured to adopt a blocked state where the output element is held in the locked position and an unblocked state where the output element is allowed to move from the locked position to the unlocked position. When the blocking device adopts the unblocked state, a front part attachment comprising the output element may be released from the power tool, either by pulling the front part attachment or by gravity. In the former case, the arrangement may further comprise a stopping member, such as a stopping ring, preventing the front part attachment from falling out by gravity.

The indexing part may comprise an engageable structure. In this case, the blocking device may comprise a blocking member, movable along the rotation axis between a blocked position and an unblocked position, and an engaging member. Furthermore, in this case, the blocking member may comprise a guide surface arranged to force the blocking member into engagement with the engageable structure when the blocking member adopts the blocked position and the output element adopts the locked position.

The engageable structure may be a recess, such as an annular recess. The engaging member may be a ball.

The blocking member may be a blocking ring. The blocking member may be concentric with respect to the rotation axis. The blocking member may be moved in the locking direction from the blocked position to the unblocked position.

The blocking device may further comprise a blocking force element arranged to force the blocking member from the unblocked position to the blocked position. The blocking force element may be a spring, such as a compression coil spring. Such coil spring may be conical.

The indexing part and the base part may be configured to engage by means of a shape lock in the locked position and in the intermediate position. The base part may comprise a base spline and the indexing part may comprise an indexing spline configured to engage the base spline.

The indexing spline may comprise a plurality of indexing teeth. Each indexing tooth may be formed with a curved profile on a side of the engageable structure. The engaging member may engage one or more of the curved profiles when the output element adopts the unlocked position. In this way, the engaging member can prevent the output element from falling out from the base part by gravity.

The base spline and the indexing spline may each comprise teeth oriented radially with respect to the rotation axis. The base spline may face radially inwards and the indexing spline may face radially outwards, or vice versa.

The driven part and the drive part may be configured to engage by means of a shape lock in the locked position. The drive part may comprise a drive spline and the driven part may comprise a driven spline configured to engage the drive spline. As long as the indexing spline does not engage the base spline, the driven spline also cannot engage the drive spline. A largest length of the base spline and the indexing spline along the rotation axis may be at least twice as long as a largest length of the drive spline and the driven spline along the rotation axis.

The drive spline and the driven spline may each comprise teeth oriented axially with respect to the rotation axis. This contributes to a very compact design of the arrangement. The drive spline may face axially in one direction along the rotation axis, and the driven spline may face axially in an opposite direction along the rotation axis. The drive part and the driven part may be arranged to meet end to end. The drive part, the drive spline, the driven part and the driven spline may form a dog clutch.

The arrangement may further comprise an alignment force element arranged to force the drive part away from the drive shaft along the rotation axis. The drive part may thus be movable relative to the drive shaft along the rotation axis while being rotationally locked to the drive shaft. The alignment force element enables the output element to be moved from the intermediate position to the locked position even if the drive spline and the driven spline are not correctly aligned. In this way, the output element is never prevented by the drive interface to move to the locked position. If the driven spline meet the drive spline "top land to top land" when moving the output element from the intermediate position to the locked position, the driven part will push the drive part along the rotation axis against the force of the alignment force element. Once the drive part starts to rotate, the teeth of the drive spline will immediately be pushed in between the teeth of the driven spline by the force from the alignment force element, such that the driven spline engages the drive spline. The alignment force element enables a compact design of the arrangement. The alignment force element may be a spring, such as a compression coil spring. Such coil spring may be conical.

According to a second aspect, there is provided a front part attachment for a power tool, the front part attachment comprising an arrangement according to the first aspect. By means of the arrangement, the front part attachment is detachably attachable to a main body of the power tool.

The front part attachment may comprise an elongated body extending perpendicularly to the rotation axis. The elongated body may be a housing. The front part attachment may for example be used in confined spaces where it is not possible to use an ordinary attachment, due to that it is difficult to access the bolt or nut of the joint to be tightened. The front part attachment may be referred to as a crowfoot, a gear front attachment or an offset attachment.

The front part attachment may comprise an output member and a drive transmission arranged to transmit a rotation of the driven part to a rotation of the output member. The front part attachment may comprise an input gear wheel and plurality of intermediate gear wheels that transmit a rotation of the input gear wheel to a rotation of the output member. The output member may comprise an output interface for engaging a bolt or a nut. The input gear wheel may be fixed to the driven part, e.g. integrally formed with or rigidly connected thereto. One, several or all of the intermediate gear wheels may lie on a line interconnecting a center of the input gear wheel with a center of the output member. In addition to the thickness of the elongated body, the front part attachment may correspond to a sum of a width of the gear wheels.

The elongated body may be fixed to, or integrally formed with, the indexing part. By disconnecting the driven part from the drive part (in the intermediate position) before the indexing part is disengaged from the base part (in the unlocked position), the arrangement makes it impossible for the elongated body to start spinning should the drive of the power tool accidentally be activated.

When the output element has been moved to the unlocked position and the front part attachment has been removed, the front part attachment may be replaced with a different front part attachment with the same interfaces, e.g. a brand new front part attachment and/or a front part attachment of different functionality.

According to a third aspect, there is provided a power tool comprising the base structure, the drive shaft, and an arrangement according to the first aspect or a front part attachment according to the second aspect. The base structure may be a tool head of the power tool.

The base part may be fixed to the base structure. The base part may for example be threaded and/or glued to the base structure.

The drive part may be rotationally locked to the drive shaft with respect to the rotation axis. The drive part may be hollow and receive the drive shaft. The drive shaft and the drive part may have corresponding profiles, such as polygonal profiles.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
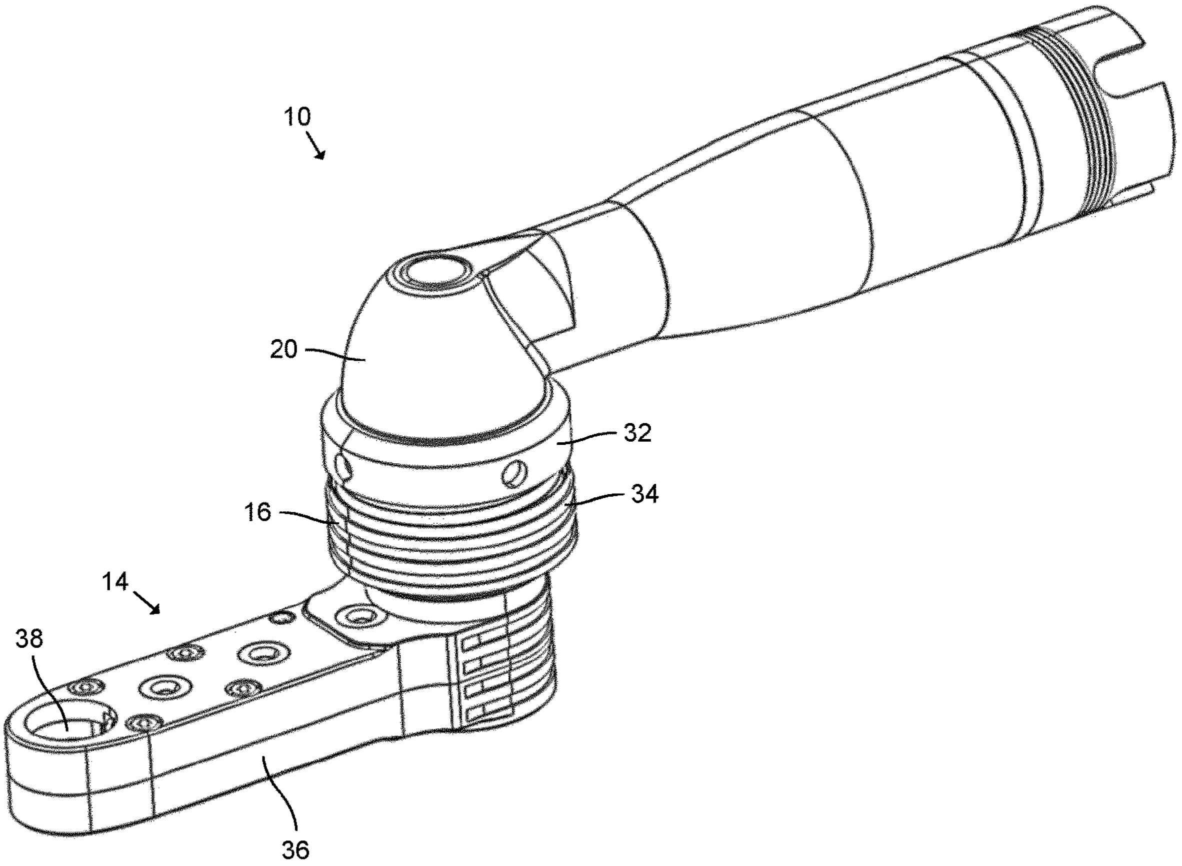
FIG. 1: schematically represents a partial perspective side view of a power tool comprising a front part attachment and an arrangement.

In the following, an arrangement for a power tool, a front part attachment comprising an arrangement, and a power tool comprising an arrangement or a front part attachment, will be described. The same or similar reference numerals will be used to denote the same or similar structural features.

Figure 2:
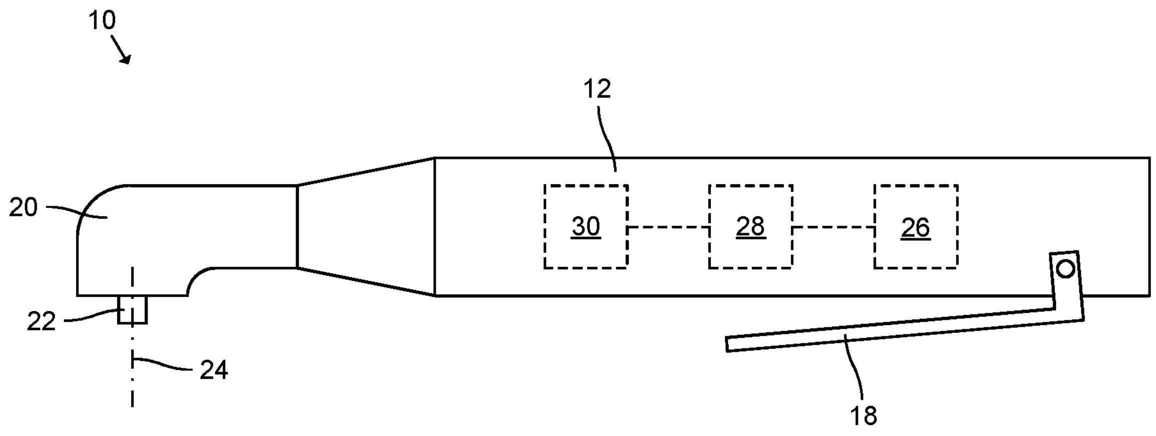
FIG. 2: schematically represents a partial side view of the power tool.

FIG. 1 schematically represents a partial perspective side view of a power tool 10, and FIG. 2 schematically represents a partial side view of the power tool 10. With collective reference to FIGS. 1 and 2, the power tool 10 comprises a main body 12, a front part attachment 14 and an arrangement 16. By means of the arrangement 16, the front part attachment 14 is detachably attachable to the main body 12. The arrangement 16 functions as a coupling or an adapter for the front part attachment 14. The main body 12 is here an angle head.

The power tool 10 of this specific example is a handheld power tool for tightening a nut. The power tool 10 may for example be driven electrically. The power tool 10 of this example further comprises a driving command element 18, here exemplified as a lever rotatable relative to the main body 12.

As shown in FIG. 2, the main body 12 comprises a base structure 20 at a distal end thereof, here exemplified as a tool head. The power tool 10 further comprises a drive shaft 22 protruding from the base structure 20. The drive shaft 22 is rotatable relative to the base structure 20 about a rotation axis 24. The drive shaft 22 of this specific example has a square profile.

The power tool 10 of this example further comprises a control system 26, a motor 28 and a motor transmission 30. The motor transmission 30 is configured to transmit a rotation of the motor 28 to a rotation of the drive shaft 22 in a manner previously known as such. The control system 26 is in signal communication with the motor 28. The control system 26 is configured to control a rotational direction and a torque of the drive shaft 22.

Referring now particularly to FIG. 1, it can be seen that the arrangement 16 of this example comprises a base part 32 and a blocking member, here exemplified as a blocking ring 34. The base part 32 is fixed to the base structure 20, here by being tightly threaded thereto, e.g. with a torque higher than a maximum torque of the power tool 10.

As further shown in FIG. 1, the front part attachment 14 comprises an elongated body 36, here exemplified as a housing. The type of front part attachment 14 in FIG. 1 is often referred to as a crowfoot. The elongated body 36 extends transverse to the rotation axis 24. In this example, the blocking ring 34 can be lifted by a user in order to change an orientation of the elongated body 36 with respect to the rotation axis 24 and in order to detach the front part attachment 14, as described herein.

The front part attachment 14 further comprises an output member 38 at a distal end of the elongated body 36. When the front part attachment 14 is attached to the main body 12 and the driving command element 18 is actuated, the output member 38 is caused to rotate, for example in order to tighten a nut.

Figure 3:
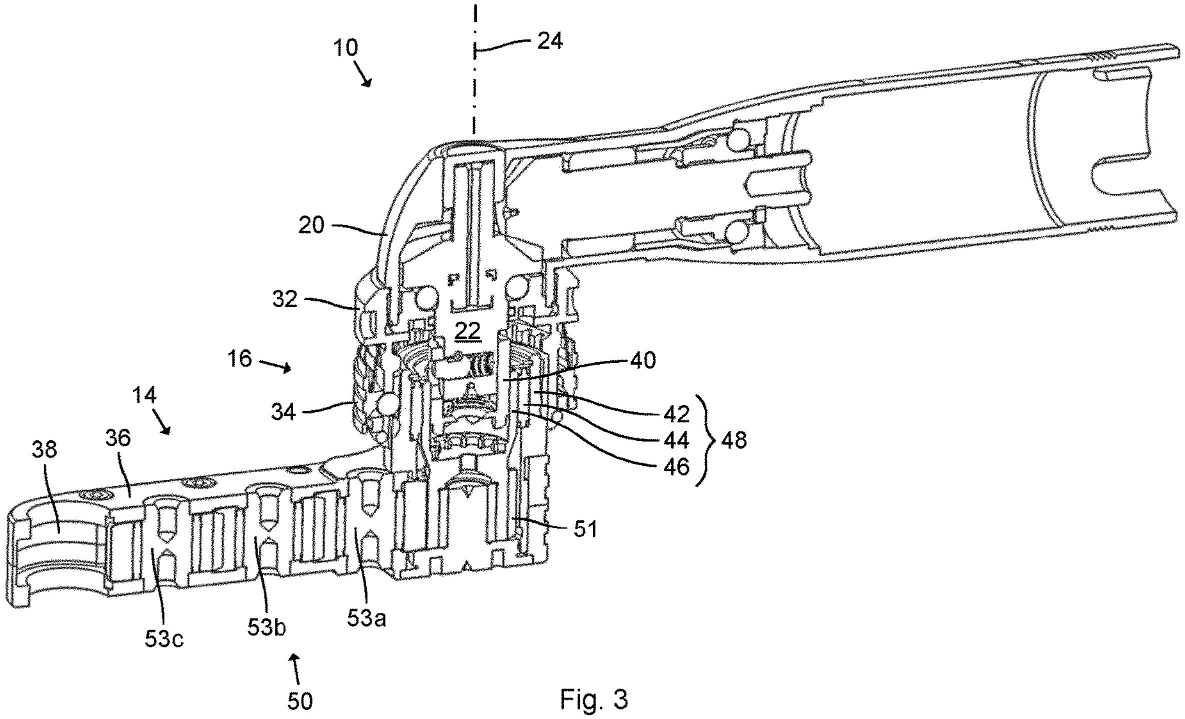
FIG. 3: schematically represents a partial perspective cross-sectional side view of the power tool.

FIG. 3 schematically represents a partial perspective cross-sectional side view of the power tool 10. As shown in FIG. 3, the arrangement 16 of this example further comprises a drive part 40, an indexing part 42, a bearing 44 and a driven part 46. The indexing part 42, the bearing 44 and the driven part 46 form one example of a output element 48 of the arrangement 16.

The drive part 40 is rotationally locked to the drive shaft 22 with respect to the rotation axis 24. In this example, the drive part 40 is however allowed to move relative to the drive shaft 22 along the rotation axis 24. The drive part 40 is concentric with the rotation axis 24. The drive part 40 is here arranged radially inside each of the base part 32, the indexing part 42 and the driven part 46 with respect to the rotation axis 24. The drive part 40 of this example is hollow for receiving the drive shaft 22. To this end, both the drive part 40 and the drive shaft 22 have corresponding square profiles.

The driven part 46 of this example is cylindrical and concentric with the rotation axis 24. The driven part 46 is arranged radially inside the indexing part 42 and the base part 32 with respect to the rotation axis 24. The driven part 46 and the indexing part 42 are locked to each other along the rotation axis 24. By means of the bearing 44, the driven part 46 is rotatable relative to the indexing part 42 about the rotation axis 24.

The indexing part 42 of this example is cylindrical and concentric with the rotation axis 24. The indexing part 42 of this example is arranged radially inside the base part 32 with respect to the rotation axis 24. The indexing part 42 is fixed to the elongated body 36.

The front part attachment 14 comprises a drive transmission 50. The drive transmission 50 is configured to transmit a rotation of the driven part 46 about the rotation axis 24 to a rotation of the output member 38. The drive transmission 50 of this example comprises an input gear wheel 51. The input gear wheel 51 is fixed to the driven part 46, here integrally formed with the same.

The drive transmission 50 of this example further comprises a plurality of intermediate gear wheels **53*a*-53*c*. The drive transmission 50 of this specific example comprises a first intermediate gear wheel 53*a* meshing with the input gear wheel 51, a second intermediate gear wheel 53*b* meshing with the first intermediate gear wheel 53*a*, and a third intermediate gear wheel 53*c* meshing with the second intermediate gear wheel 53*b* and with the output member 38. In this example, each of the intermediate gear wheels 53*a*-53*c* is positioned on a line between the input gear wheel 51 and the output member 38**.

Figure 4:
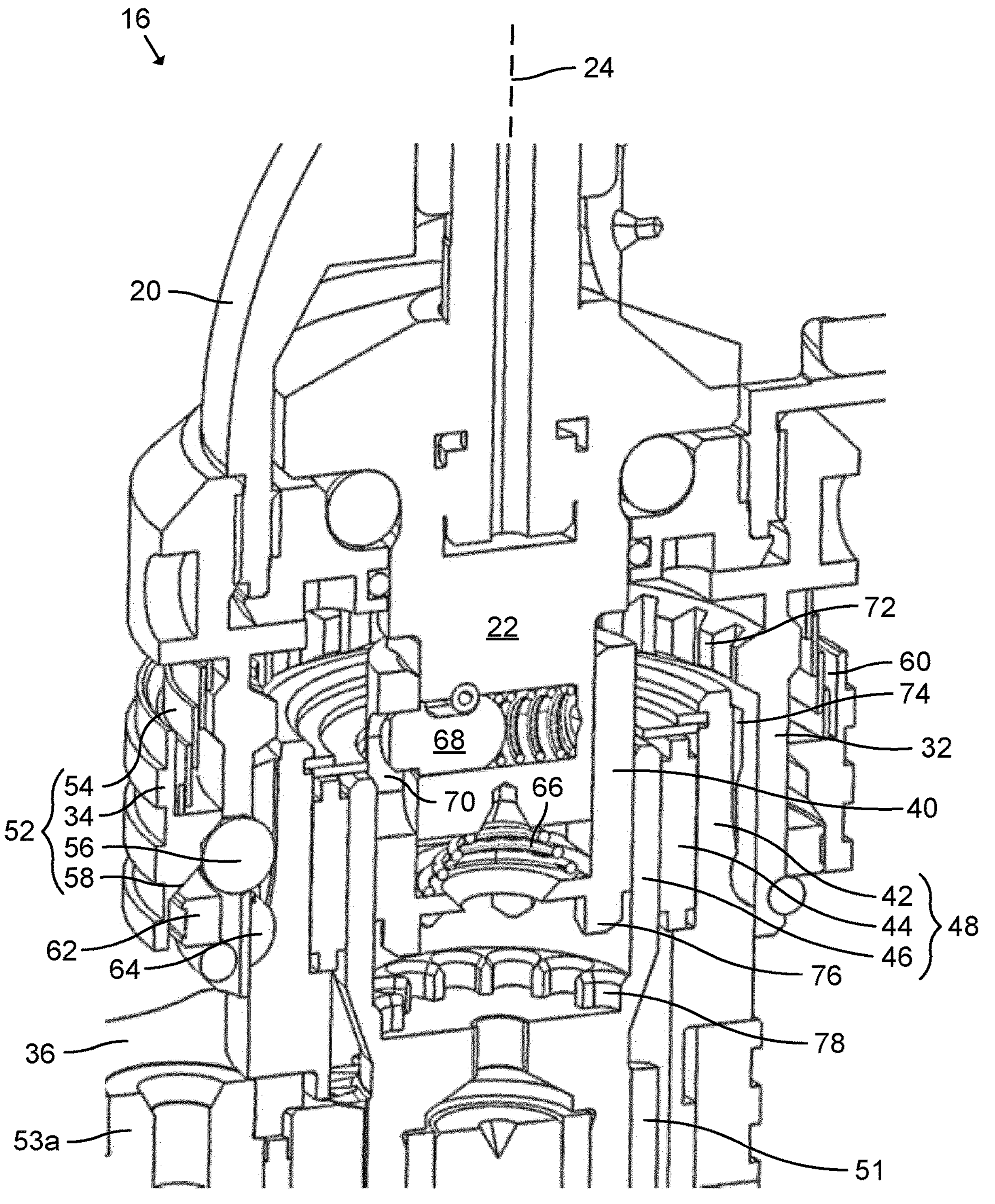
FIG. 4: schematically represents a perspective cross-sectional side view of the arrangement.

FIG. 4 schematically represents a perspective cross-sectional side view of the arrangement 16. In FIG. 4, further details of the arrangement 16 can be seen. As shown in FIG. 4, the arrangement 16 of this example comprises a blocking device 52. In addition to the blocking ring 34, the blocking device 52 of this example further comprises a blocking spring 54, a ball 56 and a guide surface 58. The guide surface 58 is sloped and provided on the inside of the blocking ring 34. As shown in FIG. 4, the blocking ring 34 of this example is concentric with the rotation axis 24 and surrounds the base part 32.

The blocking spring 54 is one example of a blocking force element according to the present disclosure. The blocking spring 54 is here exemplified as a conical compression coil spring. The blocking spring 54 forces the blocking ring 34 relative to the base part 32 (downwards in FIG. 4). One end (upper end in FIG. 4) of the blocking spring 54 contacts the base part 32 and the other end (lower end in FIG. 4) contacts the blocking ring 34. As shown in FIG. 4, the blocking ring 34 comprises an aperture 60 in which the blocking spring 54 is seated. The conical blocking spring 54 and the aperture 60 contribute to a compact design of the arrangement 16.

The ball 56 is one example of an engaging member according to the present disclosure. The ball 56 cooperates with the guide surface 58.

The arrangement 16 of this example further comprises a stopping member 62, here exemplified as a stopping ring concentric with the rotation axis 24. The stopping member 62 is fixed with respect to the base part 32. The base part 32 and the stopping member 62 form an opening for receiving the ball 56.

The indexing part 42 here comprises an annular recess 64. The recess 64 is one example of an engageable structure according to the present disclosure. The recess 64 is concentric with the rotation axis 24 and faces radially outwards. The ball 56 also cooperates with the recess 64.

The arrangement 16 of this example further comprises an alignment spring 66. The alignment spring 66 is one example of an alignment force element according to the present disclosure. The alignment spring 66 is here exemplified as a conical compression coil spring. The alignment spring 66 forces the drive part 40 away from the drive shaft 22 along the rotation axis 24 (downwards in FIG. 4). One end (upper end in FIG. 4) of the alignment spring 66 contacts the drive shaft 22 and the other end (lower end in FIG. 4) contacts the drive part 40. The conical alignment spring 66 contributes to a compact design of the arrangement 16.

FIG. 4 further shows that the drive part 40 is connected to the drive shaft 22 by means of a spring biased pin 68 engaging in an elongated slot 70 in the drive part 40. The elongated slot 70 allows the drive part 40 to move relative to the drive shaft 22 along the rotation axis 24.

FIG. 4 further shows that the base part 32 and the indexing part 42 comprise a base spline 72 and an indexing spline 74, respectively. The indexing spline 74 is configured to engage the base spline 72. The indexing part 42 is thereby arranged to engage the base part 32 by means of a shape lock. The base spline 72 comprises base teeth facing radially inwards with respect to the rotation axis 24. The indexing spline 74 comprises indexing teeth facing radially outwards with respect to the rotation axis 24. The base spline 72 and the indexing spline 74 form an indexing interface.

FIG. 4 further shows that the drive part 40 and the driven part 46 comprise a drive spline 76 and a driven spline 78, respectively. The driven spline 78 is configured to engage the drive spline 76. The driven part 46 is thereby configured to engage the drive part 40 by means of a shape lock. The drive spline 76 comprises drive teeth facing axially towards the driven part 46 along the rotation axis 24 (downwards in FIG. 4). The driven spline 78 comprises driven teeth facing axially towards the drive part 40 along the rotation axis 24 (upwards in FIG. 4). The axial orientation of the drive spline 76 and the driven spline 78 enables a compact design of the arrangement 16. The drive spline 76 and the driven spline 78 form a drive interface.

As shown in FIG. 4, the driven part 46 is arranged to meet the drive part 40 end to end. The drive part 40, the drive spline 76, the driven part 46 and the driven spline 78 here form a dog clutch. FIG. 4 further shows that the lengths along the rotation axis 24 of the base spline 72, the drive spline 76 and the driven spline 78 are substantially equal, while the length along the rotation of the rotation axis 24 of the indexing spline 74 is approximately twice as long as these lengths.

Figure 5:
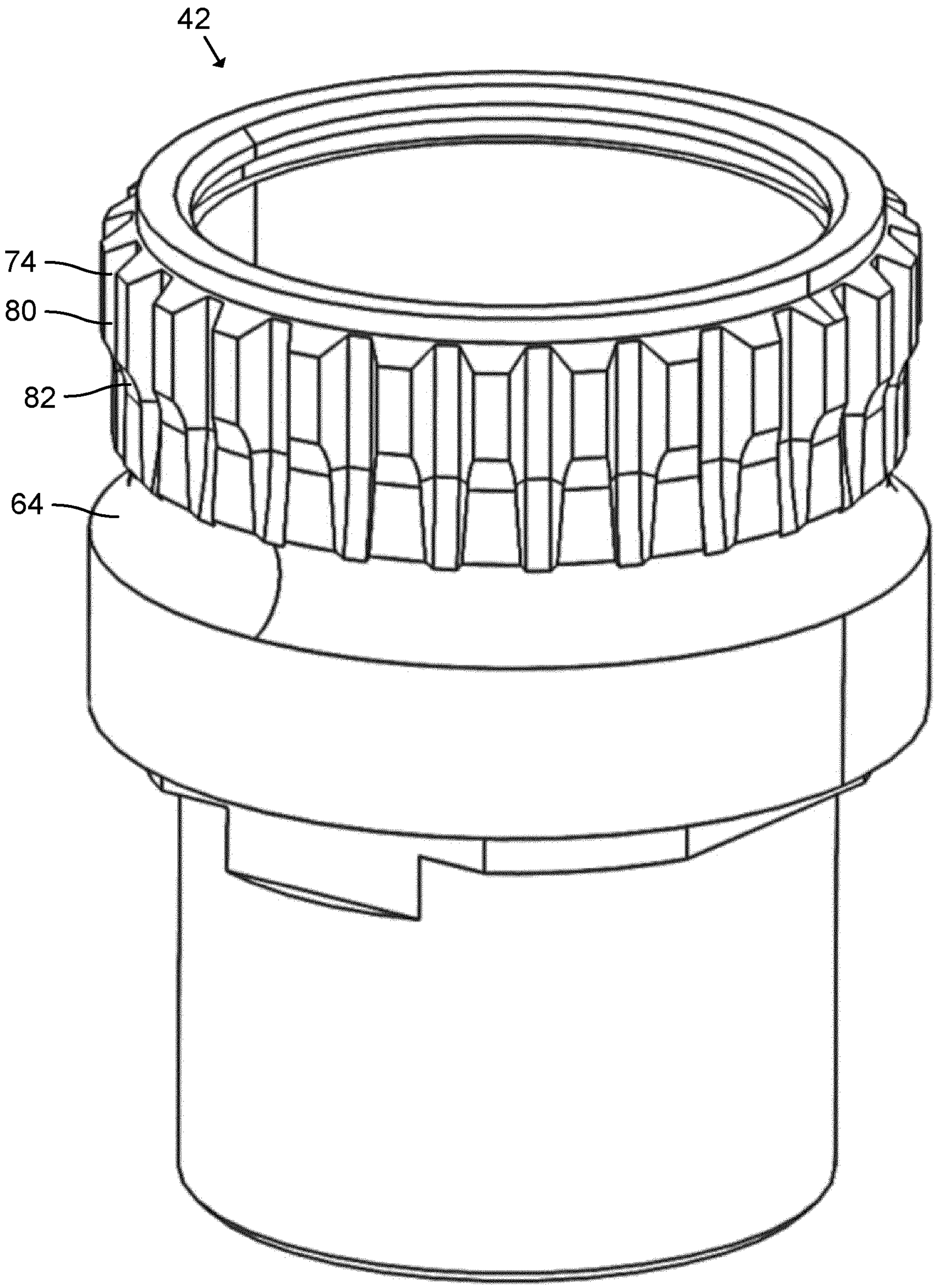
FIG. 5: schematically represents a perspective side view of an indexing part of the arrangement.

FIG. 5 schematically represents a perspective side view of the indexing part 42. FIG. 5 shows that the indexing spline 74 comprises a plurality of indexing teeth 80. Each indexing tooth 80 comprises a curved profile 82 on a side adjacent to the recess 64. The ball 56 can engage either the recess 64 or one of the curved profiles 82.

Figure 6:
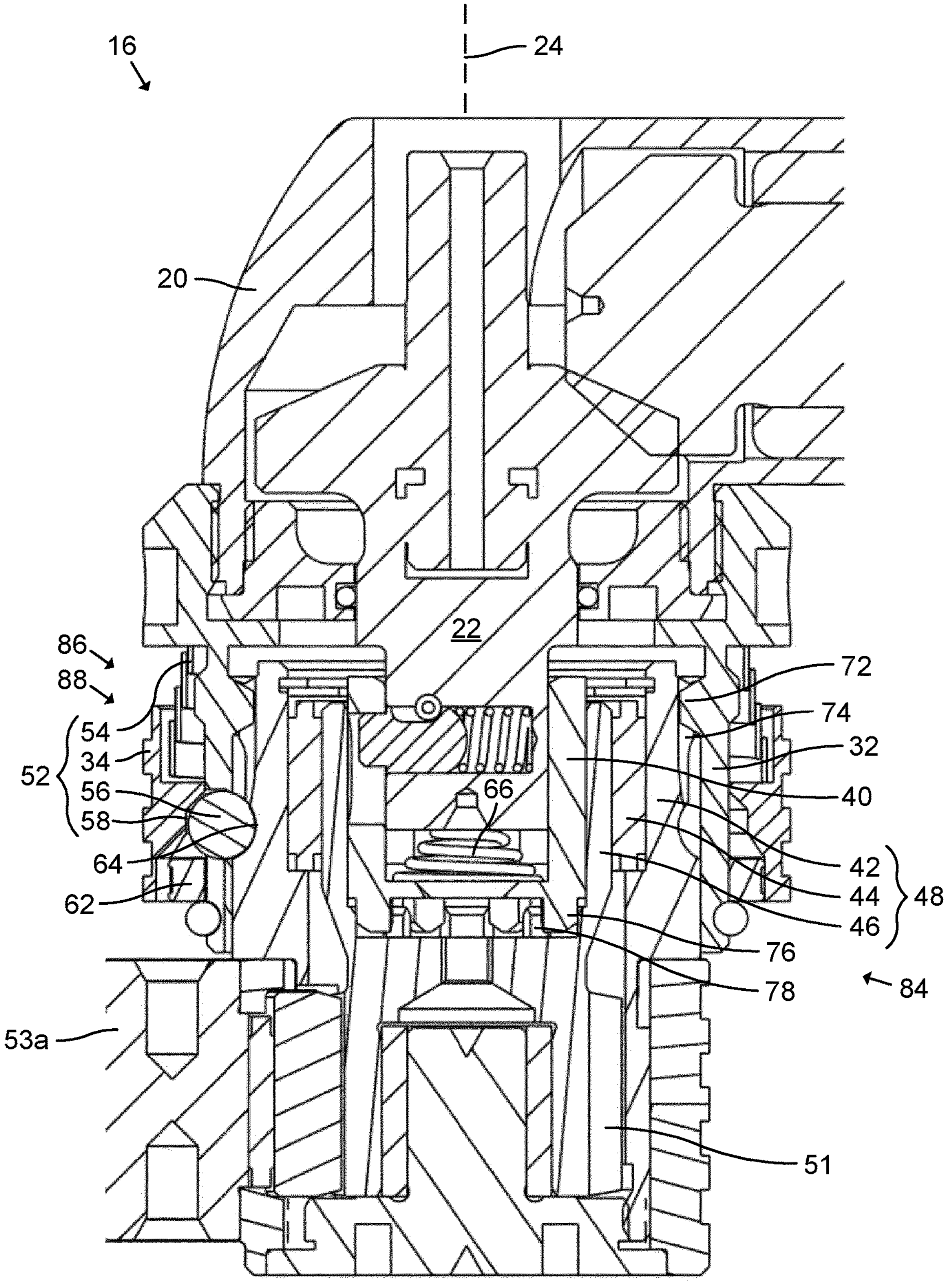
FIG. 6: schematically represents a cross-sectional side view of the arrangement when an output element is in a locked position.

FIG. 6 schematically represents a cross-sectional side view of the arrangement 16. In FIG. 6, the output element 48 is in a locked position 84. In the locked position 84, the indexing spline 74 engages the base spline 72 and the driven spline 78 engages the drive spline 76. When the indexing spline 74 engages the base spline 72, the indexing part 42 cannot rotate relative to the base part 32. When the drive spline 76 engages the driven spline 78, the drive shaft 22, the drive part 40 and the driven part 46 rotate in common about the rotation axis 24. The rotation of the driven part 46 is transmitted by the drive transmission 50 to a rotation of the output member 38.

Furthermore, the blocking device 52 is in a blocked state 86 in FIG. 6. In the blocked state 86, the blocking ring 34 is in a blocked position 88. When the blocking ring 34 is in the blocked position 88 and the output element 48 is in the locked position 84, the ball 56 is seated in the recess 64. The blocking spring 54 forces the blocking ring 34 downwards such that the guide surface 58 forces the ball 56 radially inwards into the recess 64. In this way, the blocking device 52 holds the output element 48 in the locked position 84 when the blocking device 52 adopts the blocked state 86. The ball 56 also lies axially between the base part 32 and the stopping member 62.

Figure 7:
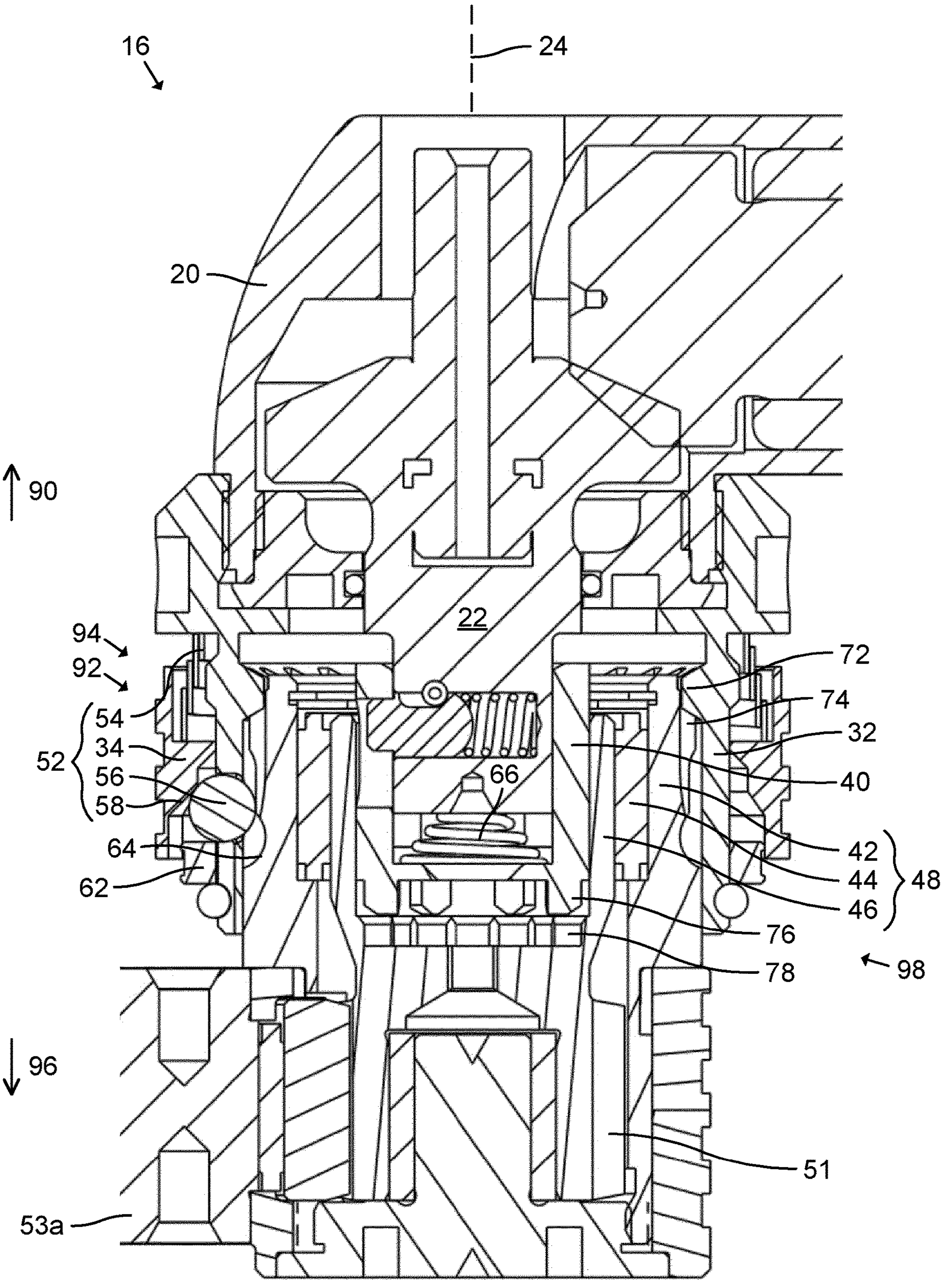
FIG. 7: schematically represents a cross-sectional side view of the arrangement when the output element is in an intermediate position.

FIG. 7 schematically represents a cross-sectional side view of the arrangement 16. A user has now moved the blocking ring 34 in a locking direction 90 along the rotation axis 24 from the blocked position 88 to an unblocked position 92. With reference to FIG. 7, the user has lifted the blocking ring 34 (upwards in FIG. 7) and holds the blocking ring 34 in the unblocked position 92. The blocking spring 54 is compressed by this movement of the blocking ring 34. The blocking spring 54 is thus arranged to force the blocking ring 34 from the unblocked position 92 to the blocked position 88. When the blocking ring 34 is in the unblocked position 92, the blocking device 52 adopts an unblocked state 94.

In FIG. 7, the output element 48 has moved in an unlocking direction 96 (downwards in FIG. 7) from the locked position 84 to an intermediate position 98. The output element 48, comprising the driven part 46, the bearing 44 and the indexing part 42, moves as a package along the rotation axis 24 from the locked position 84 to the intermediate position 98.

In the intermediate position 98, the driven spline 78 is disengaged from the drive spline 76. The driven part 46 therefore cannot be rotated by the drive part 40. However, the indexing spline 74 is still engaged with the base spline 72 in the intermediate position 98. Thus, the indexing part 42 still cannot rotate relative to the base part 32.

As shown in FIG. 7, the output element 48 has only moved a relatively short distance along the rotation axis 24 from the locked position 84 to the intermediate position 98. The use of such short distance is enabled due to the drive spline 76 and the driven spline 78 facing each other axially (with respect to the rotation axis 24). The short distance between the locked position 84 and the intermediate position 98 enables a compact design of the arrangement 16.

Due to the guide surface 58, the ball 56 is allowed to move radially outwards (with respect to the rotation axis 24) when the blocking ring 34 is lifted to the unblocked position 92 and when the output element 48 is in the intermediate position 98. The stopping member 62 prevents the ball 56 from falling out. The stopping member 62 may be of a distinguishing color, such as red. When the blocking ring 34 is in the unblocked position 92, the stopping member 62 is exposed indicating the unblocked state 94 of the blocking device 52. In the unblocked position 92 of the blocking device 52, the output element 48 is allowed to move from the locked position 84 to the intermediate position 98.

Figure 8:
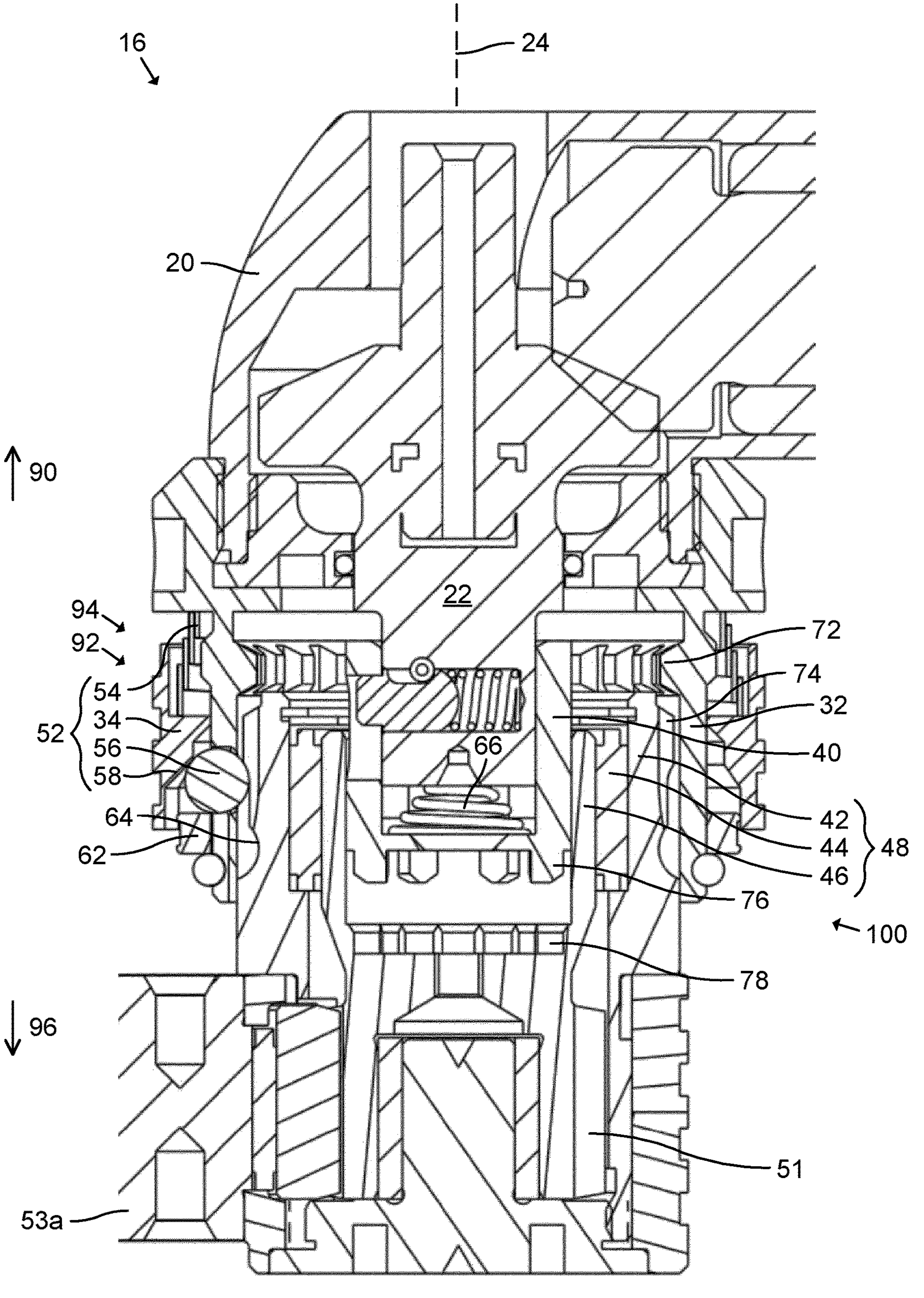
FIG. 8: schematically represents a cross-sectional side view of the arrangement when the output element is in an unlocked position.

FIG. 8 schematically represents a cross-sectional side view of the arrangement 16. In FIG. 8, the blocking device 52 is still in the unblocked state 94. The output element 48 has now moved further in the unlocking direction 96 from the intermediate position 98 to an unlocked position 100. In the unblocked position 92 of the blocking device 52, the output element 48 is thus allowed to move from the locked position 84, through the intermediate position 98, and to the unlocked position 100.

In the unlocked position 100, also the indexing spline 74 is disengaged from the base spline 72. The elongated body 36, fixed to the indexing part 42, can now be indexed or rotated as desired, for example 45° or 90° about the rotation axis 24. The exact angle available for positioning the elongated body 36 depends on the number of indexing teeth 80 of the indexing spline 74.

Since the intermediate position 98 lies between the locked position 84 and the unlocked position 100, and since the driven part 46 is disengaged from the drive part 40 in the intermediate position 98, the driven part 46 will always be disengaged from the drive part 40 before the indexing part 42 is disengaged from the base part 32. That is, the drive interface is always disengaged before the indexing interface is disengaged when pulling the output element 48 out from the base part 32. In this way, the elongated body 36 can never be accidentally rotated relative to the base structure 20 should the driving command element 18 be activated. Safety of the power tool 10 is thereby improved.

In the unlocked position 100, the ball 56 engages one of the curved profiles 82 (see FIG. 5). The output element 48 is thereby prevented from falling out from the base part 32 by gravity.

Figure 9:
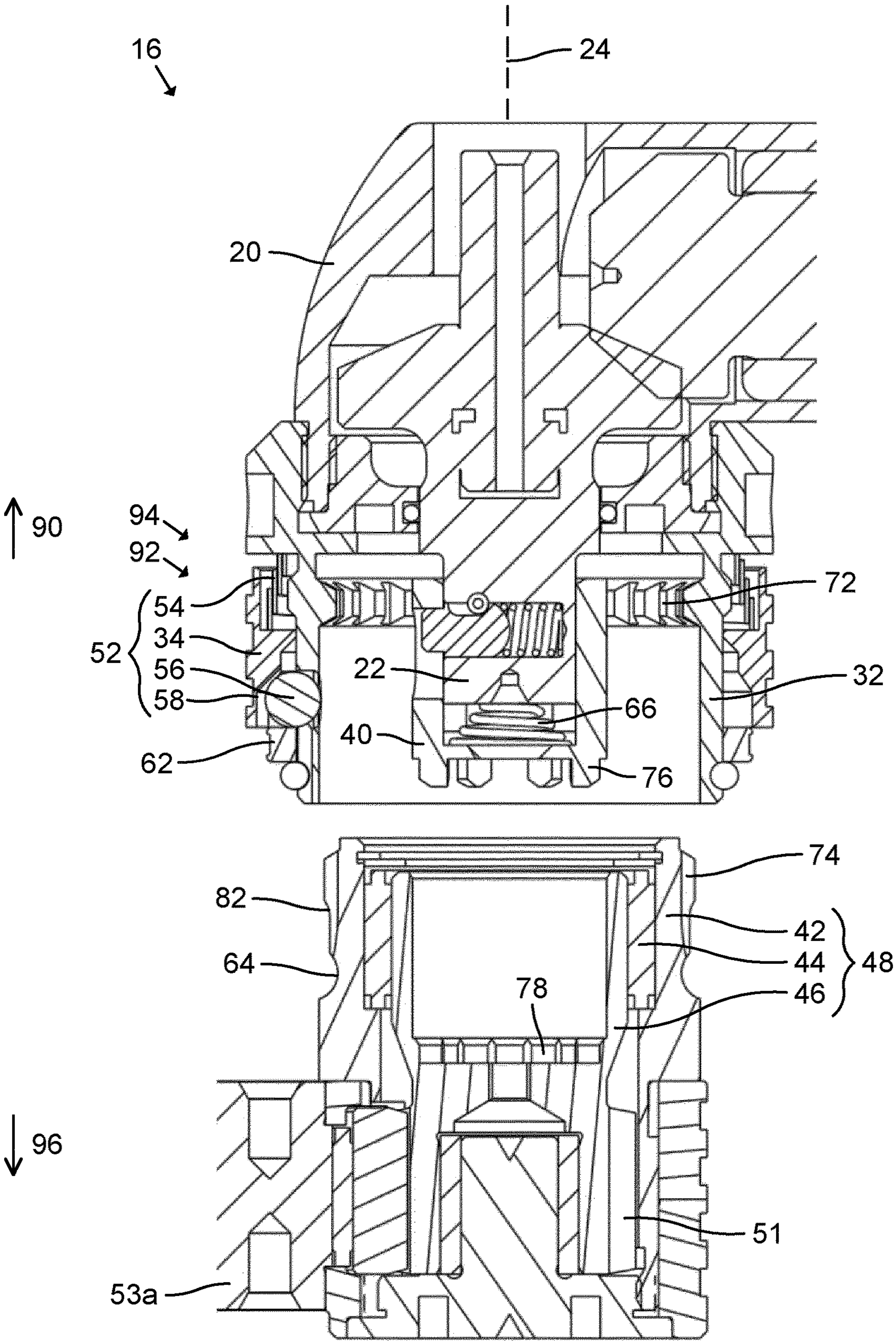
FIG. 9: schematically represents a cross-sectional side view of the arrangement when the output element has been separated from a base part.

FIG. 9 schematically represents a cross-sectional side view of the arrangement 16 when the output element 48 has been separated from a base part 32. When the output element 48 is pulled further from the unlocked position 100, the curved profile 82 forces the ball 56 further radially outwards, e.g. against a slight deformation of the blocking ring 34. Alternatively, the blocking ring 34 may be lifted slightly further in the locking direction 90 against the force of the blocking spring 54 to allow the ball 56 to move further radially outwards. This enables the output element 48 to be fully retracted and separated from the base part 32, as shown in FIG. 9. The blocking ring 34 can now be released.

Figure 10:
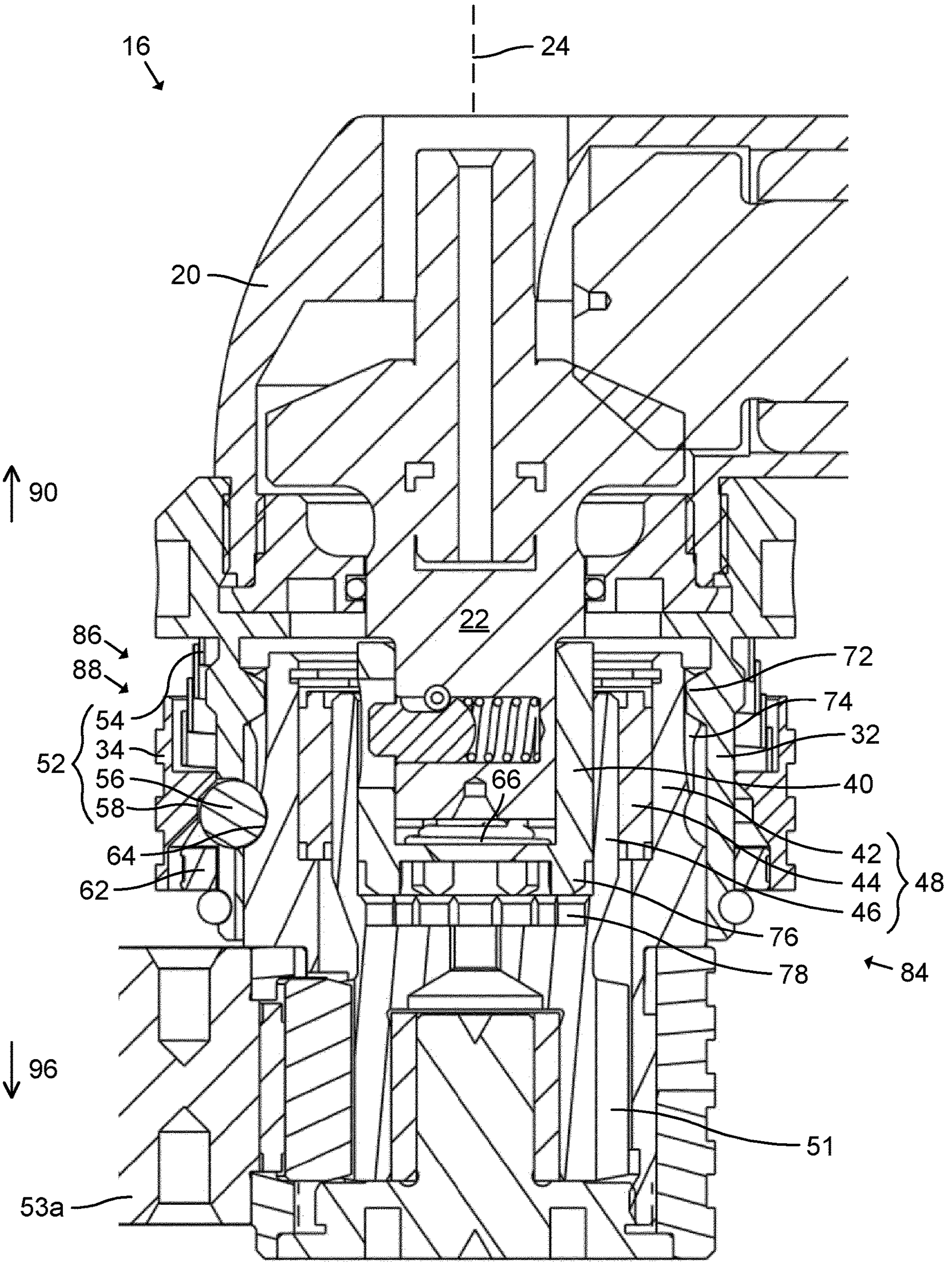
FIG. 10: schematically represents a cross-sectional side view of the arrangement when the output element has been inserted into the base part.

FIG. 10 schematically represents a cross-sectional side view of the arrangement 16 when the output element 48 has been inserted into the base part 32. The arrangement 16 thus also functions as a quick change adapter.

In FIG. 10, the indexing spline 74 engages the base spline 72. However, the driven spline 78 is not aligned with the drive spline 76. The driven teeth of the driven spline 78 meet the drive teeth of the drive spline 76 instead of meshing between the drive teeth. As a consequence, the driven part 46 pushes the drive part 40 relative to the drive shaft 22 along the rotation axis 24 in the locking direction 90 (upwards in FIG. 10) against the force from the alignment spring 66. This deformation of the alignment spring 66 enables the output element 48 to adopt the locked position 84 along the rotation axis 24 despite the driven spline 78 does not mesh with the drive spline 76. However, as soon as the drive shaft 22 starts to rotate, the drive spline 76 will become aligned with the driven spline 78 and the alignment spring 66 will push the drive part 40 in the unlocking direction 96 such that the drive spline 76 meshes with the driven spline 78.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. An arrangement for a power tool having a base structure and a drive shaft rotatable relative to the base structure about a rotation axis, the arrangement comprising:

a drive part for rotational locking to the drive shaft with respect to the rotation axis;

a base part for fixation to the base structure; and an output element having an indexing part and a driven part rotatable relative to the indexing part about the rotation axis;

wherein the output element is movable along the rotation axis relative to the drive part and the base part from a locked position where the indexing part and the base part are configured so as to connect to each other and the driven part and the drive part are configured so as to connect to each other, to an intermediate position where indexing part and the base part are configured so as to connect to each other and the driven part is disengaged from the drive part, and further to an unlocked position where the indexing part is disengaged from the base part and the driven part is disengaged from the drive part.

2. The arrangement according to claim 1, further comprising a blocking device configured to adopt a blocked state where the output element is held in the locked position and an unblocked state where the output element is allowed to move from the locked position to the unlocked position.

3. The arrangement according to claim 2, wherein the indexing part comprises an engageable structure, wherein the blocking device comprises a blocking member, movable along the rotation axis between a blocked position and an unblocked position, and an engaging member, and wherein the blocking member comprises a guide surface arranged to force the blocking member into engagement with the engageable structure when the blocking member adopts the blocked position and the output element adopts the locked position.

4. The arrangement according to claim 3, wherein the blocking device further comprises a blocking force element arranged to force the blocking member from the unblocked position to the blocked position.

5. The arrangement according to claim 1, wherein the base part comprises a base spline and the indexing part comprises an indexing spline configured to engage the base spline.

6. The arrangement according to claim 5, wherein the base spline and the indexing spline each comprise teeth oriented radially with respect to the rotation axis.

7. The arrangement according to claim 1, wherein the drive part comprises a drive spline and the driven part comprises a driven spline configured to engage the drive spline.

8. The arrangement according to claim 7, wherein the drive spline and the driven spline each comprise teeth oriented axially with respect to the rotation axis.

9. The arrangement according to claim 1, further comprising an alignment force element arranged to force the drive part away from the drive shaft along the rotation axis.

10. A front part attachment for a power tool having a base structure and a drive shaft rotatable relative to the base structure about a rotation axis, the front part attachment comprising an arrangement comprising:

a drive part for rotational locking to the drive shaft with respect to the rotation axis;

a base part for fixation to the base structure; and an output element having an indexing part and a driven part rotatable relative to the indexing part about the rotation axis;

wherein the output element is movable along the rotation axis relative to the drive part and the base part from a locked position where the indexing part and the base part are configured so as to connect to each other and the driven part and the drive part are configured so as to connect to each other, to an intermediate position where indexing part and the base part are configured so as to connect to each other and the driven part is disengaged from the drive part, and further to an unlocked position where the indexing part is disengaged from the base part and the driven part is disengaged from the drive part.

11. The front part attachment according to claim 10, wherein the front part attachment comprises an output member and a drive transmission arranged to transmit a rotation of the driven part to a rotation of the output member.

12. The front part attachment according to claim 10, wherein the front part attachment comprises an elongated body extending perpendicularly to the rotation axis.

13. A power tool comprising a base structure, a drive shaft rotatable relative to the base structure about a rotation axis, and an arrangement comprising:

a drive part for rotational locking to the drive shaft with respect to the rotation axis;

a base part for fixation to the base structure; and an output element having an indexing part and a driven part rotatable relative to the indexing part about the rotation axis;

wherein the output element is movable along the rotation axis relative to the drive part and the base part from a locked position where the indexing part and the base part are configured so as to connect to each other and the driven part and the drive part are configured so as to connect to each other, to an intermediate position where indexing part and the base part are configured so as to connect to each other and the driven part is disengaged from the drive part, and further to an unlocked position where the indexing part is disengaged from the base part and the driven part is disengaged from the drive part.

14. The front part attachment according to claim 10, wherein the arrangement further comprises a blocking device configured to adopt a blocked state where the output element is held in the locked position and an unblocked state where the output element is allowed to move from the locked position to the unlocked position.

15. The front part attachment according to claim 14, wherein the indexing part comprises an engageable structure, wherein the blocking device comprises a blocking member, movable along the rotation axis between a blocked position and an unblocked position, and an engaging member, and wherein the blocking member comprises a guide surface arranged to force the blocking member into engagement with the engageable structure when the blocking member adopts the blocked position and the output element adopts the locked position.

16. The power tool according to claim 13, wherein the arrangement further comprises a blocking device configured to adopt a blocked state where the output element is held in the locked position and an unblocked state where the output element is allowed to move from the locked position to the unlocked position.

17. The power tool according to claim 16, wherein the indexing part comprises an engageable structure, wherein the blocking device comprises a blocking member, movable along the rotation axis between a blocked position and an unblocked position, and an engaging member, and wherein the blocking member comprises a guide surface arranged to force the blocking member into engagement with the engageable structure when the blocking member adopts the blocked position and the output element adopts the locked position.

* * * * *